United States Patent Office 2,905,703
Patented Sept. 22, 1959

2,905,703

CYCLIC POLYSILOXANES DERIVED FROM DICHLOROSILANE AND DIMETHYLDICHLOROSILANE

Donald L. Bailey, Snyder, and Edward R. York, Endwell, N.Y., assignors to Union Carbide Corporation, a corporation of New York No Drawing. Application May 3, 1955
Serial No. 505,842

2 Claims. (Cl. 260—448.2)

This invention is concerned with novel compositions of matter derived from mixtures of dichlorosilane and dimethyldichlorosilane. More particularly, the invention relates to novel cyclic polysiloxanes prepared by the hydrolysis of a mixture of dichlorosilane and dimethyldichlorosilane in solvent medium at relatively low temperatures.

Briefly described, the cyclic compounds of the present invention may be prepared by the hydrolysis in an aqueous ether solution, e.g., diethyl ether, isopropyl ether, butyl ether, etc., of dichlorosilane and dimethyldichlorosilane at about ice temperature. It has been found that cyclic tetramers, pentamers and hexamers, which are non-viscous liquids, will result from such a hydrolysis. These compounds are more stable to depolymerization than the cyclic polysiloxanes prepared from dichlorosilane alone, such materials being described in our co-pending application for Letters Patent, Serial No. 495,773, filed March 21, 1955, now U.S. Patent No. 2,810,628. Some higher boiling cyclic polysiloxanes are also produced in such a hydrolysis but when the conditions are properly selected in accordance with the hereindescribed invention, such higher molecular weight materials are in the minority. At room temperature and substantially above, up to about 175° C., all three of the principal cyclic materials have been found to be thermally stable.

The preparation of the hereindescribed cyclic copolymeric polysiloxanes may be carried out at about ice temperature or below and up to about room temperature, i.e. about 25° C. At such temperatures it has been found that the predominant product from the hydrolysis of the hereindescribed mixtures is tetramer and pentamer with a minor amount of hexamer. The preferred temperature is at about 0° C., i.e. about ice temperature, and such temperature may be obtained by direct contact with ice, by the controlled evolution of hydrogen chloride from the copolymerizing mixture, or in any other suitable manner. On the other hand the reaction may be carried out by precooling the reaction ingredients to about dry ice temperature, i.e., —78° C. and then conducting the reaction without additional cooling medium.

In the preparation of the hereindescribed materials, mole ratios of the dimethyldichlorosilane and dichlorosilane of from about 1–10 to about 10–1 may be reacted. Thus, the cyclic materials may be prepared with an excess of either the dichlorosilane or the dimethyldichlorosilane in the mixture. Generally speaking, however, it is preferred to employ a mole ratio of from about 1–1 to about 5–1 of dimethyldichlorosilane to dichlorosilane.

Having thus described the general conditions of reaction and the solvents suitable for use in the preparation of these cyclic polysiloxanes from mixtures of dichlorosilane and dimethyldichlorosilane, there is set forth below, for purposes of illustration and not of limitation, a specific example of the manner in which the cyclic materials may be prepared.

Example

A cold solution of 594 cc. (4.95 moles) of dimethyldichlorosilane and 165 g. (1.65 moles) of dichlorosilane dissolved in 500 cc. of diethyl ether was hydrolyzed by rapid addition from a dropping funnel with stirring to 2 kg. of crushed ice and 2500 cc. of diethyl ether. The hydrolysis mixture thus obtained was placed in a separatory funnel and the ether layer containing the cohydrolysis products was separated from the aqueous acid layer. After washing the ether layer with water and dilute sodium bicarbonate solution to remove traces of hydrochloric acid present the ether was removed from the cohydrolysis products by distillation up to a kettle temperature of 125° C. at atmospheric pressure. There was obtained 414 grams of a fluid cohydrolyzate containing 169 cc. hydrolyzable hydrogen/gram (theory=167 cc. hydrolyzable hydrogen/gram).

The cohydrolyzate was then distilled under reduced pressure to a kettle temperature of 150° C. at 1 mm. There was obtained 260.5 grams of volatile material containing 133 cc. of hydrolyzable hydrogen/gram and 150 grams of a residue containing 242 cc. hydrolyzable hydrogen/gram. The volatile material was fractionated under reduced pressure but no pure compounds could be obtained because of the difficulty in separation. However, on combining the fractions distilling below 72° C. at 17 mm. and fractionating this material at atmospheric pressure in a nitrogen atmosphere there was isolated a compound distilling at 156–158° C. This compound weighed 41 grams and contained 177 cc. hydrolyzable hydrogen/gram. It was identified as the mixed cyclic tetramer, [(Me$_2$SiO)$_3$(H$_2$SiO)] containing $$[(Me_2SiO)_2(H_2SiO)_3]$$

An example of equilibration of the above cyclic tetramer is presented below:

To 20 g. (0.075 mole) of [(Me$_2$SiO)$_3$ (H$_2$SiO)] there was added 0.36 g. (0.0022 mole) of hexamethyldisiloxane and 0.1 g. (0.5 wt. percent) of concentrated sulphuric acid. The mixture was agitated for 6 hours at room temperature to effect polymerization. The resulting polymeric oil was mixed with water to deactivate the catalyst and 100 cc. of isopropyl ether was added. The ether solution containing the copolymer was separated from the aqueous phase and washed with dilute sodium bicarbonate solution. After removal of low-boiling material below 150° C. and 1 mm. pressure there was obtained 18.5 g. of equilibrated copolymer with a viscosity of 135 cs. at 25° C. and containing 186.5 cc. of hydrolyzable hydrogen/g. (theory for hydrolyzable hydrogen=167 cc./g.). The linear copolymer resulting from the equilibration of the cyclicpolysiloxane had a composition and viscosity essentially the same as dihydrogensiloxanedimethylsiloxane copolymers prepared by equilibration of a mixture of pure cyclic dimethylsiloxane and cyclic dihydrogensiloxane or by direct hydrolysis (with or without subsequent equilibration) of the respective dichlorosilanes. Such linear copolymers are highly effective as water repellents for paper and textiles, as described and claimed in copending application for Letters Patent Serial No. 495,773, filed March 21, 1955, now U.S. Patent No. 2,810,628.

Inasmuch as it is possible, when employing the cyclic materials of the present invention to prepare trifunctional impurity-free linear polymers, it has been found desirable to equilibrate in the manner shown above such cyclic materials rather than hydrolyzing mixtures of the various silanes which almost inevitably contain at least a minor amount of trifunctional impurity, e.g., methyltrichlorosilane.

While the structure of the novel cyclic materials of this invention will be apparent from the foregoing description and example, there is set forth below for the purpose of illustration the general formula of the novel compounds:

$$[(H_2SiO)_m (Me_2SiO)_n]$$

In the general formula Me represents a methyl hydrocarbon radical, $m$ and $n$ are integers from 1 to 5 inclusive, and the sum of $m$ and $n$ is a positive integer from 4 to 6 inclusive.

Having thus described our invention, what we claim as novel and desire to protect by Letters Patent is as follows:

1. A cyclic polysiloxane having the general formula:

$$[(H_2SiO)_m (Me_2SiO)_n]$$

wherein Me represents a methyl hydrocarbon radical, $m$ is an integer from 1 to 5 inclusive, $n$ is an integer from 1 to 5 inclusive, the sum of $m$ and $n$ is a positive integer from 4 to 6 inclusive, and the number of hydrogen atoms in said polysiloxane is unequal to the number of methyl radicals therein.

2. The cyclic polysiloxane $[(H_2SiO) (Me_2SiO)_3]$.

References Cited in the file of this patent

UNITED STATES PATENTS

| | | |
|---|---|---|
| 2,547,678 | Wilcock | Apr. 3, 1951 |
| 2,595,891 | Sauer | May 6, 1952 |
| 2,647,911 | Nitzche | Aug. 4, 1953 |

OTHER REFERENCES

Rochow "An Introduction to the Chemistry of the Silicones," 2nd ed. (1951), John Wiley and Sons, Inc. (New York), publishers, pp. 79–81.